Nov. 7, 1961 W. D. AMMONS 3,007,203
METHOD OF MOLDING A FOAM PLASTIC ARTICLE HAVING
A SKIN ON ITS OUTER SURFACES
Filed Sept. 23, 1958
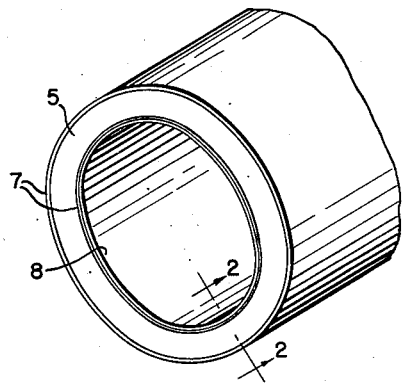
FIG. 1.
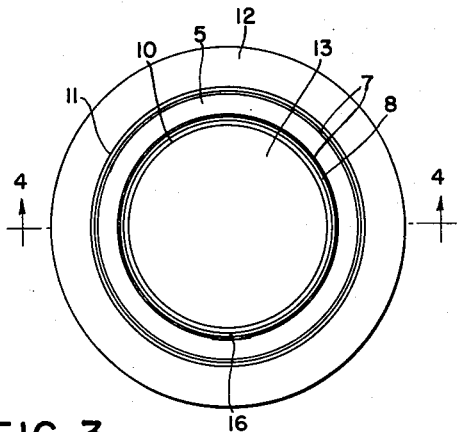
FIG. 3.
FIG. 4.
FIG. 2.
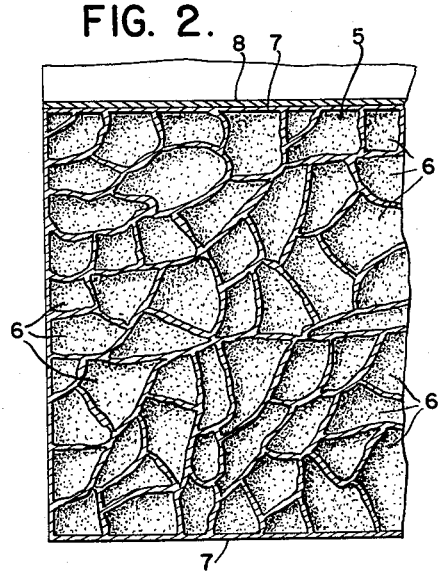
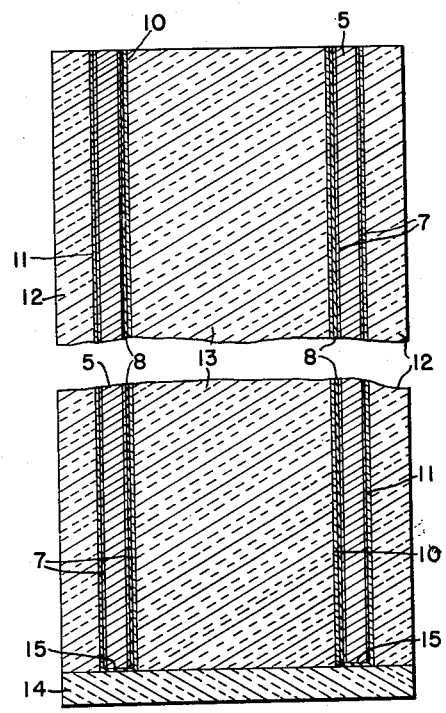
INVENTOR
WALTER D. AMMONS
BY *Ephraim Banning*
ATTORNEY

United States Patent Office 3,007,203
Patented Nov. 7, 1961

3,007,203
METHOD OF MOLDING A FOAM PLASTIC ARTICLE HAVING A SKIN ON ITS OUTER SURFACES
Walter D. Ammons, 2020 SW. 18th Ave., Fort Lauderdale, Fla.
Filed Sept. 23, 1958, Ser. No. 762,775
2 Claims. (Cl. 18—48)

This invention relates to a method of molding an insulating product which may be produced in different forms according to the use intended. A slab, such as a batt, is one form, and another is a tubular duct having a desired cross section—round, rectangular, or otherwise. In the ensuing description a duct will be treated as an exemplification of the product of this invention—a duct designed for the movement therethrough of fluids of various kinds. Such a duct may be advantageously produced in sections having a standard length say, 6 feet, these sections being formed for end to end interfitting, if desired, and when interconnected with their joints sealed providing a fluid-tight conduit. Other sections in the form of elbows, T's, etc., may be interposed in such a conduit system to meet the requirements for turns, branches, etc.

The insulating product herein disclosed is substantially fireproof, and is endowed with the properties of lightness, high thermal resistivity, and immunity to migration of water or vapor into or through the body of the duct. It is also flexible and resilient to a minor extent, and easily shaped and trimmed to desired sizes at the place of installation. The method of production may be carried on expeditiously and economically with equipment, automatic or otherwise, that is relatively inexpensive so that the completed product will be commercially available at a price which compares favorably with the most satisfactory ducts of the present time. Also by the present process I am able to vary to some extent the properties which are built into the insulating product in order to meet conditions which are special and unusual. Such an insulating product in a desired form for use in a conduit system has special utility in connection with the heating and cooling of buildings or rooms therein by the circulation of temperature-controlled air, as is common at the present day.

The accompanying drawing illustrates the present insulating product, and the steps involved in its production, when made into the form of a hollow duct, the several views showing in—

FIGURE 1, a perspective view looking toward one end portion of a duct section; FIG. 2, a sectional detail on a greatly enlarged scale, taken on line 2—2 of FIG. 1; FIG. 3, a top plan view, more or less diagrammatical, of one end of a vertically disposed duct section as it appears while retained within a simplified mold wherein the duct section may be produced; and FIG. 4, a longitudinal central section through the mold and duct section therewithin, taken on line 4—4 of FIG. 3.

The duct section of FIGS. 1 and 2 is a wholly cast product made of a suitable polymer, such as polyurethane. The body 5 of this duct section is a cellular structure with a multitude of cells 6 (see FIG. 2) wherein gas generated during the molding stage is trapped and held. The enclosing walls defining the body cells are relatively thin, and they serve to seal off the cells, one from another, so that the resulting structure is light in weight and markedly buoyant.

In the present duct the inner and outer surfaces of major area, curved or otherwise, are desirably sealed off by the formation thereon of a skin 7 which is continuous and impervious to migration therethrough of liquid, moisture, or vapor. This skin also seals off all cells lying adjacent the exposed surfaces of the duct section so that gas contained therein will be trapped the same as in the cells disposed further inwardly of the duct body.

I have also shown a special lining 8 spread over the inner surface of the duct section. As illustrated, this lining is in the form of a coating applied to and united with the inner surface of the duct section; such a lining may be affixed as a covering over the outer surface of the duct section or, if desired one such lining (or covering) may be carried upon each such surface, depending upon the conditions to be withstood when placed in use. A lining interiorly of the duct section provides a very smooth surface tending to reduce the flow resistance of any gas flowing through the duct. It also enhances the insulation value of the duct and provides, independently of any skin 7 which may or may not be formed upon the duct inner surface, a vapor seal which will effectively prevent migration therethrough of moisture or condensate present in or with the gas that is flowed through the duct. The provision of such a lining or covering upon the outer surface of the duct body may be specially advantageous where its installation will be out in the open and exposed to the weather, or where it will be installed underground with surrounding conditions of dampness tending toward deterioration, etc. The material for the lining may be metal, plastic, vinyl, or the like, which is applied as a thin sheet or foil, a spray, coating, or otherwise.

The insulation value of the polymer material forming the duct body is very high. Also, because of its cellular structure wherein a relatively large volume of gas is trapped, the weight of each duct section may be safely held to a point as low as 2 lbs. per cubic foot. The aggregate volume of the gas cells exceeds very substantially that of the walls defining such cells. This factor of density which is controllable (as will later be pointed out), enables one to increase the weight up to 20 lbs. or so per cubic foot where special conditions are to be met as, for example, where liquids, heavy or otherwise, are to be flowed through a conduit made up of the present duct sections.

The duct body is also substantially fireproof and highly resistant to deterioration irrespective of whether the movement of fluids therethrough be more or less continuous or intermittent. These characteristics render the present duct body peculiarly suitable for many conduit uses where gases, dry or moist, are to be flowed from one point to another, or where liquids varying widely in their physical and chemical properties are to be moved.

The production of duct sections or other insulating bodies embodying the present invention may proceed expeditiously by the utilization of molds wherein the products are cast to the desired size and shape. A simplified mold for casting duct sections is illustrated more or less diagrammatically in FIGS. 3 and 4 to which reference will now be made.

For a duct section of normal length, the mold may comprise inner and outer walls 10 and 11, respectively, defining an annulus if the cross section is to be round. A jacket 12 of insulating material is shown as fitted around the mold outer wall 11, and a core 13 of like material within the inner wall 10. The jacket and core provide blankets contacting the exterior surfaces of the two walls of the mold to retard the transmission of heat outwardly therefrom. As shown, the axis of the annular walls is vertically disposed, the mold being rested upon a base block 14 also of insulating material.

The mold walls are desirably made of sheet metal which is relatively thin and strong, and the confronting faces of the two walls are smooth to produce on the completed casting exposed surfaces of like smoothness. An end wall 15 interconnects the mold walls 10 and 11 at the base. In accordance with common practice, part or all of the outer wall 11 is movable outwardly from the axis of the mold, and its inner wall 10 may be collapsible or slightly tapered endwise, if desired, to free the casting for removal from the mold by an axial movement relative thereto. A simplified mold construction, such as that just described, will suffice for a disclosure of the method involved in casting the present insulating product, whether it be in the form of a duct or otherwise.

The first step is to ready the mold for use. This involves moving the outer wall 11 inwardly to closed position (see FIG. 3) where it is suitably secured. If a lining 8 is to form part of the completed casting, it is then applied to the outer face of the mold inner wall 10, and if a foil or sheet be used its opposite end portions may be interconnected as by a friction tape 16. A polymer, such as polyurethane, with which a suitable catalyst has been mixed in the proper amount, is then pounded into the mold. At that moment the chemical reaction, then freshly started, will have raised the temperature a very few degrees, to about 85° F. The continued reaction during the next ten to twenty minutes, while the mixture remains in a liquid state within the mold, causes the temperature to reach a high point of approximately 120° F. The particular polymer and catalyst chosen for the mixture may be varied to a considerable extent, and this comment applies also to the proportions of each that are used in the mixture. Experience will readily point the way to what is most satisfactory. By changing the mixture in either of the ways suggested, the density of the resulting casting can be made as light as 2 lbs. per cubic foot or as heavy as 20 lbs. per cubic foot, while maintaining intact all the desirable physical properties requisite for a satisfactory duct section or other insulating body.

During the initial stage of the operation, while the heat thus self-generated in the body of the mixture continues to rise, there is also taking place a liberation of gas which ascends through the foaming mixture in the form of bubbles some of which escape at the top into the atmosphere. Heat from the mixture is also transferred to the walls of the mold whose temperature is desirably the same as, or slightly more than, that of the mixture when first introduced into the mold, i.e. about 85° F. With continued rise in temperature of the mixture, the temperature of the surrounding mold walls is also raised in general consonance therewith. After reaching the high point of approximately 120° F., the temperature of the mixture will gradually subside along with a decline in the amount of gas which is liberated for (1) escape into the atmosphere, or (2) entrapment within the body of the mixture as solidification thereof takes place.

The insulation which blankets the exterior mold wall surfaces acts effectively to prevent radiation of heat from the mold into the atmosphere, thereby retarding the descent of the mold temperature when the mixture itself has started to cool down. This is important, because it assures that the peripheral areas of the mixture will be prevented from cooling down faster than other portions of its body interiorly thereof. Due to the retarded peripheral cooling of the mixture, the gas bubbles therein which are disposed at or adjacent the exposed surfaces of the casting then taking form, will tend to become sealed upon such faces the same as elsewhere within the mixture body. The result is entrapment of the gas within the peripheral cells, a sealing of each one from the others, and the formation of a smooth and impervious skin extending continuously over the exposed surfaces of the casting then under production. The insulating blankets in contact with the exterior surfaces of the mold walls continue to maintain a heated condition thereof even after hardening of the casting and its removal from the mold, and until a fresh batch of the mixture has been introduced into the mold preparatory to production of the next succeeding casting in the regular course of operations. By this means I make certain that the mold temperature will be maintained to the minimum point, about 85° F., up to the time of introduction of each new batch of mixture into the mold in regular sequence.

The time required for liberation of gas takes from 10 to 20 minutes. After that, the temperature of the mixture will gradually subside coincidentally with solifidication thereof into a casting having the required strength and other desirable properties adapting it for the intended use. Within the space of 45 minutes the casting will be ready for removal from the mold by an axial movement, after first opening the outer wall 11 to free the casting for such movement. It will be noted that the stage of rising temperature is shorter than the succeeding stage of falling temperature by a considerable margin. So that the mold temperature may be enabled to rise at approximately the same rate as that of the mixture, but drop at a lower rate, I employ for the mold walls a material such as sheet metal which is thin and of low mass but endowed with high thermal conductivity, in conjunction with an insulating blanket applied to the exterior of the mold walls. By this arrangement, the transfer of heat from the mixture to the mold is enabled to proceed rapidly, but the reverse transfer back to the solidifying mixture from the mold will be relatively slow. Because of this fact, I am able to control the physical characteristics of the casting exterior surfaces of major area by forming thereover an unbroken skin which effectively seals the gas-filled peripheral pockets within the body of the casting and thereby assures prevention of moisture migration thereinto.

The lining of foil or other suitable material, initially fitted around the outer face of the mold inner wall 10, slides freely lengthwise thereof in response to a light force applied axially to the casting; this lining also remains bonded to the casting as a result of its intimate contact with the mixture during the entire casting operation. As hereinbefore noted, the application of such a lining to the casting, as well as the casting surface chosen for its reception, are optional. The same comment holds true for the insulating blanket and the mold wall or walls to be contacted thereby. For some duct sections it may be preferable to omit such a lining and/or to employ only one such blanket, depending upon the many variables to be taken into account at the time.

Each duct section, after removal from the mold, should be set aside for curing. This need not take more than 24 hours. After that, the duct section is ready to be joined end to end with other like sections in providing a conduit system which may be depended upon to perform serviceably through an indefinite period with deterioration a negligible factor.

I claim:

1. The method of producing a plastic casting from a polymer such as polyurethane comprising the steps of first mixing a suitable catalyst with the plastic material to initiate a reaction involving the generation of heat and liberation of gas then in a first stage of a casting operation, during which the self-generation of heat and gas is proceeding within the mixture, of transferring the mixture, while still relatively cool, into a warm mold having forming walls of high heat conductivity to which the heat self-generated in the mixture may be readily transferred whereby the temperature thereof is raised in general consonance with that prevailing in the mixture, then in the next succeeding stage of the casting operation, during which the temperature and gas liberation in the mixture gradually subsides, of retarding the interchange, to a selected peripheral area of the mixture, of heat previously transferred therefrom to the mold whereby to decelerate the temperature drop in such peripheral area and permit the formation thereat of an impervious skin for entrapment within the solidifying mixture body of gas still retained therein, and finally in removing the mixture, when solidified in the form of a casting and relatively cool, from the mold while the latter is still relatively warm and thermally conditioned for reception therein of a fresh batch of mixture for production of the next succeeding casting in the regular sequence of operations.

2. The method of casting a section of plastic duct through which a fluid may pass, comprising the steps of first mixing a suitable catalyst with a polymer such as polyurethane to promote a reaction involving the generation within the mixture body of heat and gas, then pouring the mixture, while still at a low point in its range of temperature movement, into a mold preheated to a temperature approximating that of the mixture when introduced therein, the mold having at least one wall of high heat conductivity to which heat is transferred readily from the mixture as its temperature is raised in response to self-generation of heat and gas within its own body, then retarding the transfer of heat back from the mold to the mixture body while the temperature of the mixture and liberation of gas subsides during solidification of the mixture within the mold, and finally in removing the solidified casting from the mold while the former is relatively cool and the latter is relatively warm and ready to receive a fresh batch of mixture in the next succeeding casting operation.

References Cited in the file of this patent

UNITED STATES PATENTS

| | | |
|---|---|---|
| 1,409,059 | Miller | Mar. 7, 1922 |
| 2,340,956 | Gillette | Feb. 8, 1944 |
| 2,594,838 | Alexander et al. | Apr. 29, 1952 |
| 2,642,920 | Simon et al. | June 23, 1953 |
| 2,728,702 | Simon et al. | Dec. 27, 1955 |
| 2,768,407 | Lindermann | Oct. 30, 1956 |
| 2,797,731 | Carlson | July 2, 1957 |
| 2,926,389 | Garlington | Mar. 1, 1960 |